H. A. KENNEDY.
BEARING SCRAPER.
APPLICATION FILED OCT. 23, 1919.
1,365,174.
Patented Jan. 11, 1921.
2 SHEETS—SHEET 2.
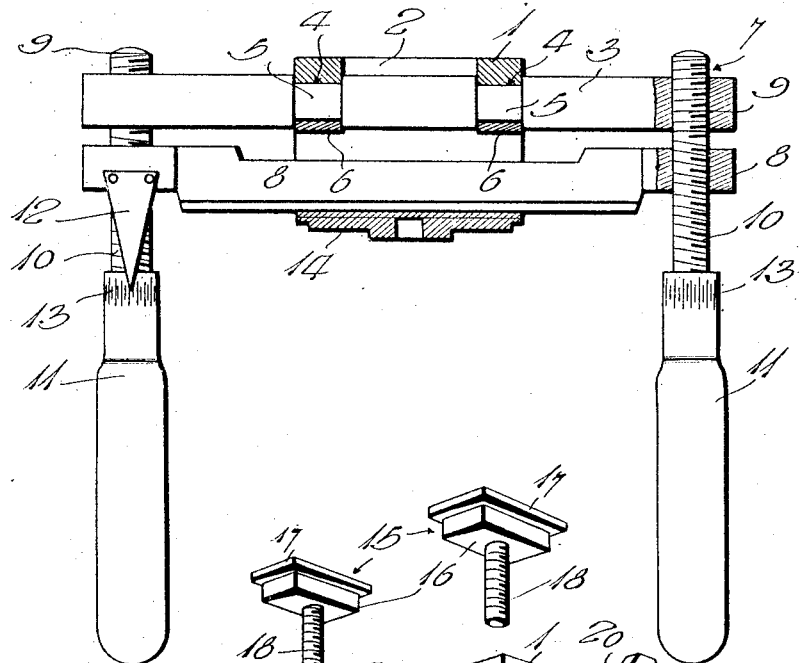
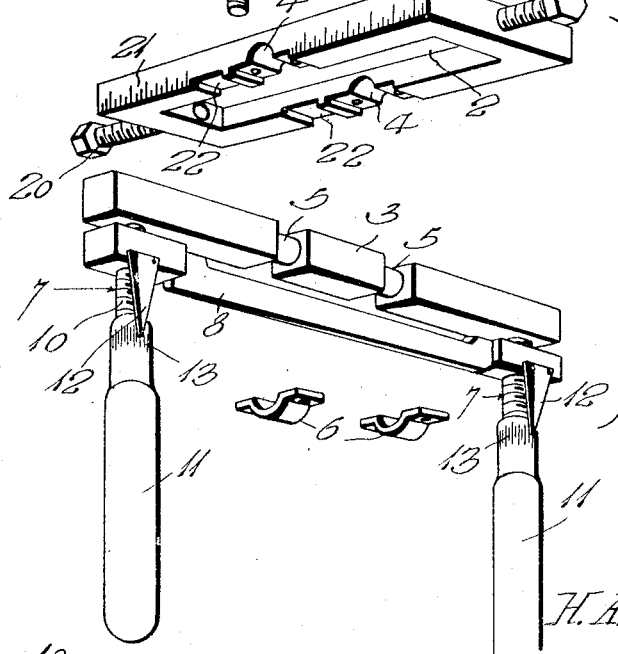
Witness
H. Woodard
Inventor
H. A. Kennedy
By H. B. Wilson & Co.
Attorneys

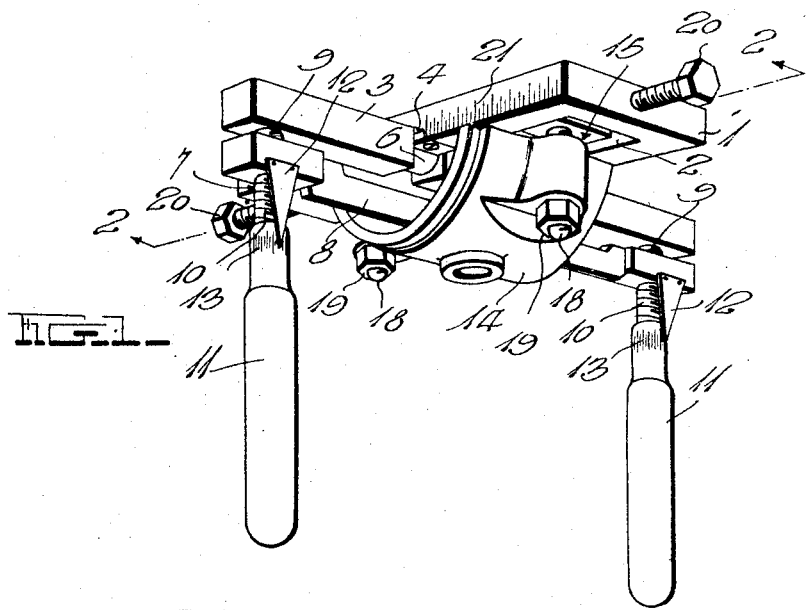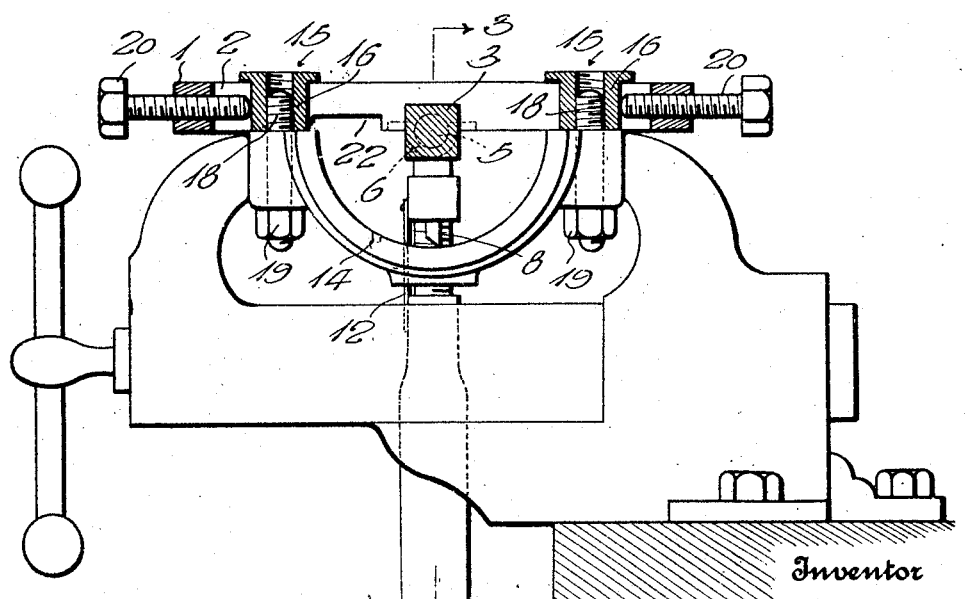

UNITED STATES PATENT OFFICE.

HOWARD A. KENNEDY, OF LATONIA, KENTUCKY.

BEARING-SCRAPER.

1,365,174.  Specification of Letters Patent.  Patented Jan. 11, 1921.

Application filed October 23, 1919. Serial No. 332,639.

*To all whom it may concern:*

Be it known that I, HOWARD A. KENNEDY, a citizen of the United States, residing at Latonia, in the county of Kenton and State of Kentucky, have invented certain new and useful Improvements in Bearing-Scrapers; and I do declare the following to be a full, clear, and exact description of the invention, such as will enable others skilled in the art to which it appertains to make and use the same.

This invention relates to improvements in bearing scrapers.

The principal object of the invention is to provide a tool of the above mentioned character which is so designed that it may be effectively used to scrape the inner surface of a bearing, the whole device being adapted to be held in any ordinary bench vise, and being adjustable to work effectively on various sizes of bearings.

Another object is to provide a device of the above mentioned character which is extremely simple in construction, strong, durable, effective in operation, and comparatively inexpensive to manufacture.

Other objects and advantages of the invention will become apparent during the course of the following description.

In the accompanying drawings forming a part of this specification and in which like numerals are employed to designate like parts throughout the same, Figure 1 is a perspective view of a tool constructed in accordance with my invention.

Fig. 2 is a longitudinal section on the line, 2—2 of Fig. 1, showing the device in use with a vise.

Fig. 3 is a section on the line 3—3 of Fig. 2.

Fig. 4 is a detail view of the parts disassembled.

In the drawings, wherein for the purpose of illustration is shown a preferred embodiment of my invention the numeral 1 designates a substantially rectangular frame having an opening 2 therein. Pivotally mounted on this frame is a rock shaft 3. While this shaft may be mounted on the frame in any suitable manner, I prefer to provide the frame 1 with centrally located oppositely disposed notches or recesses 4 and journal the shaft therein. To this end I provide the shaft with spaced axles or journals 5 and these journals are seated in the notches 4 and retained therein by small U-shaped clamping plates 6. Rock shaft 3 is also provided with threaded apertures adjacent its opposite ends and oppositely threaded bolts 7 are engageable therewith. These bolts also extend through the threaded apertures in a scraper knife or blade 8 which is adjustable with respect to the shaft 3. Obviously this adjustment is due to the fact that each bolt 7 is provided with right and left hand threads 9 and 10 respectively. The left-hand screw-threads 9 are engageable with the correspondingly screw threaded apertures in the shaft 3, while the right-hand screw-threads 10 co-act with the screw-threaded apertures in the blade 8. These bolts 7 are rotated by detachable handles 11. In order to regulate and set the blade at any desired distance from the rock shaft 3, I provide a very fine adjustment. To this end it will be seen that I preferably secure an indicator or pointer 12 to the blade 8 and this pointer co-acts with the graduations 13 on the handle 12. Hence, it will be seen that this construction permits the same adjustment to be had for any particular work. In other words, the blade may be properly adjusted with respect to the shaft 3 to make the same cut on bearings of the same size, so that all bearings of the same size may be effectively scraped, and then by changing the adjustment bearings of a different size may be scraped. This feature of construction assures that each bearing of the same size will be properly scraped, that is, one will not be cut deeper than another.

The tool as described is especially intended to be used in connection with cylindrical bearings, although it is also adaptable for use on various other types of bearings. However, for the sake of a clear illustration of the tool and the manner of using it, I have shown a half of a cylindrical bearing or bearing cap as indicated at 14. This bearing is held in position on the frame 1 by slidable retaining members 15. While these members may be of any other suitable construction I prefer to employ rectangular blocks 16 which fit rather snugly in the rectangular opening 2. Each block is provided with flanges 17 and the flanges bear on the upper surface of the frame. Each block is also provided with a threaded stud or bolt 18 which is adapted to extend through an eye in the bearing 14. This stud 18 may be cast integral with the block or it may be separate and fit into a threaded hole in the block. However, the method of this construction is immaterial. After these studs 18 have been passed through the eyes in the bearing, nuts 19 are placed thereon, thus holding the bearing in position. The blocks are properly adjusted by set screws 20 carried by the frame 1. With this construction it will be seen that the blocks 16 may be readily and easily moved toward each other to position the studs 18 for engagement with the bearing to be scraped. In order to determine the proper position of the studs for engagement with a certain sized bearing cap I provide graduations 21 along one edge of the frame 1 and this permits the blocks and studs to be properly positioned for the various sizes of bearings.

Inasmuch as the present construction of the blade would not otherwise scrape the entire inner surface of the bearing, I provide a pair of oppositely disposed notches or seats 22 in the under face of the frame 1 and when the blade is moved, say to the left, it is dropped into this notch thereby permitting the fine cutting edge to act on the entire surface to be scraped. Of course when the blade is moved in the opposite direction the cutting edge will engage the extreme point to be scraped without the use of these notches.

The device will be preferably used in connection with an ordinary bench vise, the manner in which it is placed therein being shown in Fig. 2. Before placing the device in the vise the bearing retaining blocks will be adjusted in the manner already set forth and the bearing 14 clamped on the frame 1. Then by rotation of the handles 11 the knife blade 8 will be adjusted against the inner surface of the bearing to be scraped. Now, the operator will grasp the handles and move them to and from him, thus scraping the inner surface of the bearing in the manner desired.

A tool of this construction is superior in use and a great deal more effective than the ordinary hand scraper generally employed for this purpose. It is adjustable to various sizes and types of bearings, and the adjustment may be made very fine. It insures that the entire inner surface of the bearing is evenly scraped.

It is to be understood that the form of my invention herein shown and described is to be taken as a preferred form of the same, and that various changes in the shape, size, and arrangement of parts may be resorted to without departure from the spirit of the invention or the scope of the subjoined claims.

Having thus described my invention, I claim:—

1. A bearing scraping device comprising a supporting member, bearing holding members slidable on said members, means carried by the latter for moving the bearing holders toward each other, a rock shaft on said supporting member, being disposed transversely with respect to the latter, adjusting screws arranged at the opposite ends of said shaft, and a scraper blade having screw-threaded engagement with said screws, permitting it to be adjusted toward and from the shaft.

2. A device of the character set forth comprising an open supporting frame, slidable bearing retaining members having threaded studs extending therefrom, said studs being adapted to pass through eyes in the bearing to be scraped, clamping nuts for said studs, means co-acting with said bearing retaining members to move them toward each other, a handle pivotally mounted on said frame, and an adjustable scraper blade carried by said handle, whereby the blade may be swung back and forth in the line of an arc.

3. A device of the character set forth comprising a frame, a rock shaft on said frame, a pair of screw-threaded parallel handles carried by said rock shaft and extending therefrom, a scraper blade extending between said handles and having screw-threaded engagement therewith, whereby when the handles are rotated the blade will be adjusted with respect to the rock shaft, and means carried by said frame to retain the bearing to be scraped thereon, substantially as set forth.

4. A device of the character set forth comprising a frame, a rock shaft mounted on said frame, a scraper blade, screws extending through said blade and shaft, each screw having right and left hand threads thereon, the threads of one direction co-acting with said rock shaft and the threads of the other direction co-acting with the latter to move the blade and toward and from the shaft, a detachable handle having screw-threaded engagement with each screw, each handle having graduations thereon, an indicator carried by said blade adapted to co-act with the graduations, and means to retain the bearing to be scraped on said frame.

5. A device of the character set forth comprising a frame having an opening therein, a handle pivotally mounted on said frame, an adjustable scraper blade carried by said handle, means to retain the bearing in position on said frame, said retaining means including a pair of blocks having flanges thereon of a greater width than the opening in the frame, said blocks being adapted to slide toward each other in said opening, threaded studs associated with the blocks, each stud being adapted to pass through an eye in the bearing to be scraped, clamping nuts to engage said bolts, and means co-acting with said blocks to move them toward each other.

6. A device of the character set forth comprising a substantially rectangular open frame having a pair of centrally located oppositely disposed notches therein, a rock shaft having screw-threaded apertures adjacent its ends and spaced journal portions adjacent its center, said journals being rotatable in said notches, clamping plates to retain said journals in the notches, a scraper blade having screw-threaded apertures adjacent its ends, adjusting screws extending through said apertures in the blade and rock shaft, and detachable hand grips having threaded engagement with said screws.

7. A bearing scraper comprising a member, a rock shaft rotatably mounted thereon, screws carried by the shaft and extending at right angles from the latter, being disposed in parallelism with one another, a scraper blade arranged between the screws being provided with screw-threaded holes adjacent its opposite ends through which said screws extend, thus permitting the blade to be adjusted toward and from the rock shaft when the screws are rotated, means for engaging and holding the bearing in position to be worked on, and means to rotate said shaft.

8. A bearing scraper comprising an open supporting frame, slidable bearing retaining members arranged on the frame having screw-threaded studs extending therefrom for passage through eyes in the bearing to be scraped, clamping nuts for said studs, means co-acting with said members for moving them toward each other, and means for scraping the bearing.

In testimony whereof I have hereunto set my hand.

HOWARD A. KENNEDY.